United States Patent
Fink et al.

(10) Patent No.: US 10,315,576 B1
(45) Date of Patent: *Jun. 11, 2019

(54) BLIND-SPOT MONITORING USING MACHINE VISION AND PRECISE FOV INFORMATION

(71) Applicant: Ambarella, Inc., Santa Clara, CA (US)

(72) Inventors: Alexander Fink, Austin, TX (US); Shimon Pertsel, Mountain View, CA (US)

(73) Assignee: Ambarella, Inc., Santa Clara, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/884,844

(22) Filed: Jan. 31, 2018

Related U.S. Application Data

(63) Continuation of application No. 14/706,222, filed on May 7, 2015, now Pat. No. 9,931,985.

(51) Int. Cl.
| | |
|---|---|
| *G06T 7/20* | (2017.01) |
| *B60R 1/08* | (2006.01) |
| *G06T 7/11* | (2017.01) |
| *G06K 9/00* | (2006.01) |
| *H04N 7/18* | (2006.01) |

(52) U.S. Cl.
CPC .......... *B60R 1/081* (2013.01); *G06K 9/00805* (2013.01); *G06T 7/11* (2017.01); *G06T 7/20* (2013.01); *H04N 7/183* (2013.01); *B60R 2300/102* (2013.01); *B60R 2300/202* (2013.01); *B60R 2300/301* (2013.01); *B60R 2300/8026* (2013.01); *B60R 2300/8093* (2013.01); *G06T 2207/30261* (2013.01)

(58) Field of Classification Search
CPC .............. B60R 1/081; B60R 2300/102; B60R 2300/202; B60R 2300/301; B60R 2300/8026; B60R 2300/8093; G06K 9/00805; G06T 7/004; G06T 7/20; G06T 7/183; G06T 2207/30261
USPC ......................................................... 348/148
See application file for complete search history.

(56) References Cited

U.S. PATENT DOCUMENTS

| | | | | |
|---|---|---|---|---|
| 7,038,577 B2 * | 5/2006 | Pawlicki | ............. | H05K 999/99 340/435 |
| 2010/0220406 A1 * | 9/2010 | Cuddihy | ................ | B60R 1/025 359/843 |

(Continued)

*Primary Examiner* — William C Vaughn, Jr.
*Assistant Examiner* — Jae N Noh
(74) *Attorney, Agent, or Firm* — Christopher P. Maiorana, PC

(57) ABSTRACT

An apparatus includes a camera, a sensor and a processor. The camera may generate a video signal based on a targeted view of a driver. The sensor may generate a proximity signal in response to detecting an object within a predetermined radius. The processor may determine a location of the object with respect to the vehicle, determine a current location of eyes of the driver, determine a field of view of the driver at a time when the proximity signal is received based on the current location of the eyes, determine whether the object is within the field of view using the current location of the eyes, and generate a control signal. The distance may be determined based on a comparison of reference pixels of a vehicle component in a reference video frame to current pixels of the vehicle component in the video frames.

13 Claims, 9 Drawing Sheets

(56) References Cited

U.S. PATENT DOCUMENTS

| | | | |
|---|---|---|---|
| 2010/0265600 A1* | 10/2010 | Okuda | B60R 1/02 |
| | | | 359/843 |
| 2010/0315215 A1* | 12/2010 | Yuda | H04N 5/2259 |
| | | | 340/435 |
| 2016/0090043 A1* | 3/2016 | Kim | B60R 1/081 |
| | | | 701/49 |

* cited by examiner

BLIND-SPOT MONITORING USING MACHINE VISION AND PRECISE FOV INFORMATION

This application relates to U.S. Ser. No. 14/706,222, filed May 7, 2015, which is incorporated by reference in its entirety.

FIELD OF THE INVENTION

The present invention relates to video capture devices generally and, more particularly, to a blind-spot monitoring using machine vision and precise field of view (FOV) information.

BACKGROUND OF THE INVENTION

Blind zones, or blind spots, in a vehicle are a leading cause of accidents between vehicles. Studies show that a majority of drivers do not know how to align mirrors correctly. Furthermore, when drivers use vehicles that are not their own, or use a shared vehicle, drivers often find the process of manual mirror adjustment of vehicle mirrors to be too bothersome for a single trip.

Current blind-spot detection systems are expensive (since they typically use radar), and tend to warn the user about vehicles that are in certain pre-determined zones around the vehicle. The warning is provided regardless of whether the driver is actually able to see surrounding vehicles or not. A decision to alert the driver (or not) is based on an assumption about typical blind spots in the field of view (FOV) of the driver, but does not rely on knowledge of the actual blind-spots of each particular driver. Many vehicles are being equipped with in-car camera systems that monitor attentiveness and drowsiness of the driver.

It would be desirable to implement a blind-spot monitoring using machine vision and precise FOV information to determine blind spots and to warn drivers in order to significantly increase driver safety.

SUMMARY OF THE INVENTION

The present invention concerns an apparatus comprising a camera, a sensor and a processor. The camera may generate a video signal based on a targeted view of a driver. The sensor may generate a proximity signal in response to detecting an object within a predetermined radius. The processor may determine a location of the object with respect to the vehicle, determine a current location of eyes of the driver, determine a field of view of the driver at a time when the proximity signal is received based on the current location of the eyes, determine whether the object is within the field of view using the current location of the eyes, and generate a control signal. The distance may be determined based on a comparison of reference pixels of a vehicle component in a reference video frame to current pixels of the vehicle component in the video frames.

The objects, features and advantages of the present invention include providing blind-spot monitoring using machine vision and precise FOV information that may (i) determine a field of view of a driver, (ii) improve object detection in blind-zones, (iii) estimate a location of eyes of a driver, (iv) be implemented using existing in-car cameras, (v) warn a user of objects in blind spots, (vi) be implemented with various vehicle sensor systems, (vii) determine actual blind-spots of a driver, (viii) provide visual feedback about blind-zones and/or (ix) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
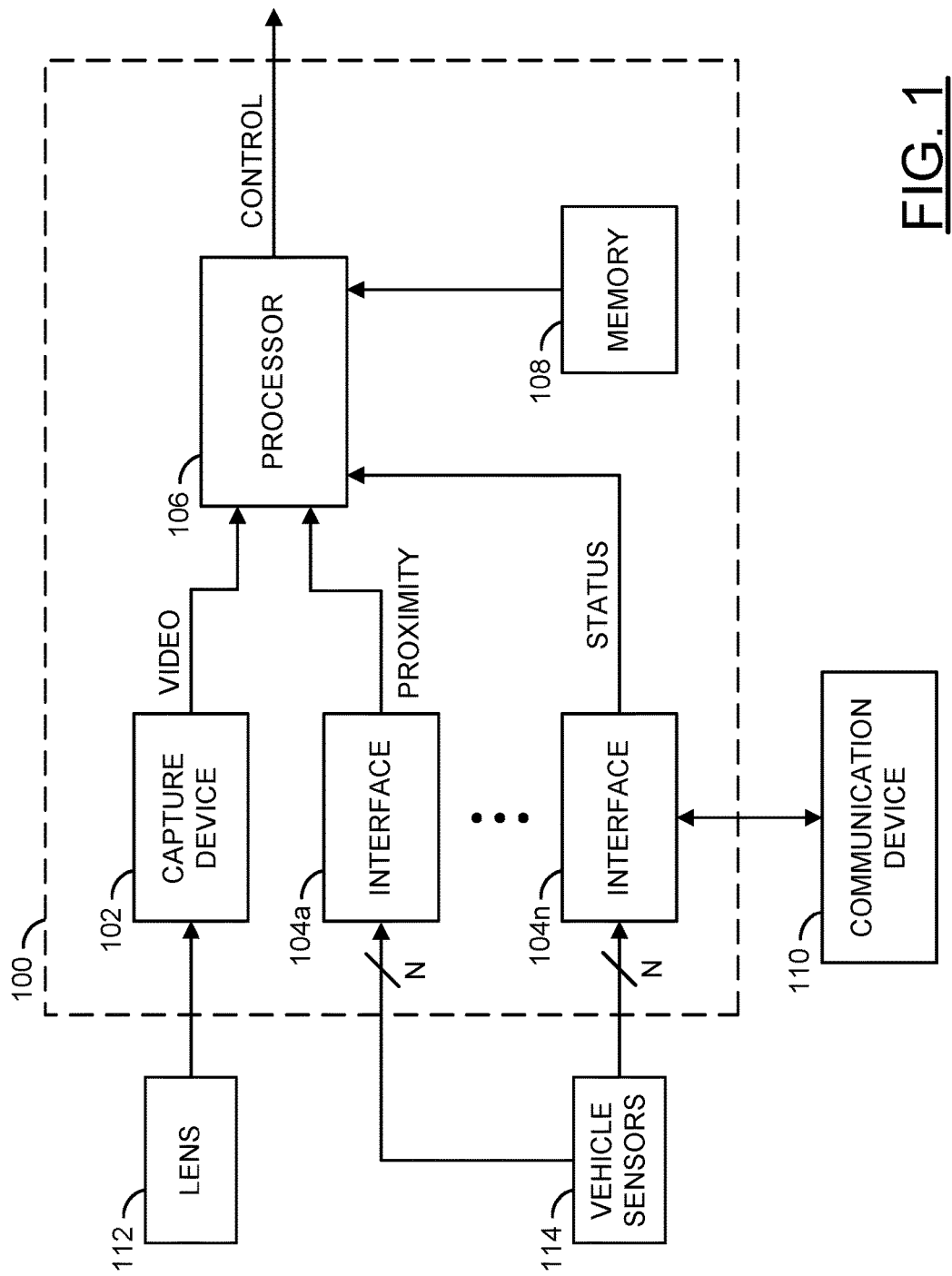
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, blocks (or circuits) 104a-104n, a block (or circuit) 106, and a block (or circuit) 108. The circuit 102 may implement a capture device. The circuits 104a-104n may implement various interfaces. The circuit 106 may be configured as a processor. The circuit 108 may be configured as a memory. The camera system 100 is shown connected to a block (or circuit) 110. The circuit 110 may be an external communication device. In some embodiments, the communication device 110 may be implemented as part of the camera system 100. The camera system 100 is shown receiving input from a block (or circuit) 112. The block 112 may be a lens (e.g., a camera lens). In some embodiments, the lens 112 may be implemented as part of the camera system 100. The camera system is shown receiving input from a block (or circuit) 114. The circuit 114 may represent various vehicle sensors. In some embodiments, the camera system 100 may be implemented as a drop-in solution (e.g., installed as one component).

The capture device 102 may present a signal (e.g., VIDEO) to the processor 106. The interfaces 104a-104n may present various signals to the processor 106. The interface 104a is shown presenting a signal (e.g., PROXIMITY) to the processor 106. The interface 104n is shown presenting a signal (e.g., STATUS) to the processor 106. The number and/or types of signals presented by the various interfaces 104a-104n may be varied according to the design criteria of a particular implementation. The processor 106 may be configured to receive the signal VIDEO, the signal PROXIMITY and/or the signal STATUS. The processor 106 may be configured to generate a signal (e.g., CONTROL). The inputs, outputs and/or arrangement of the components of the camera system 100 may be varied according to the design criteria of a particular implementation.

Figure 2:
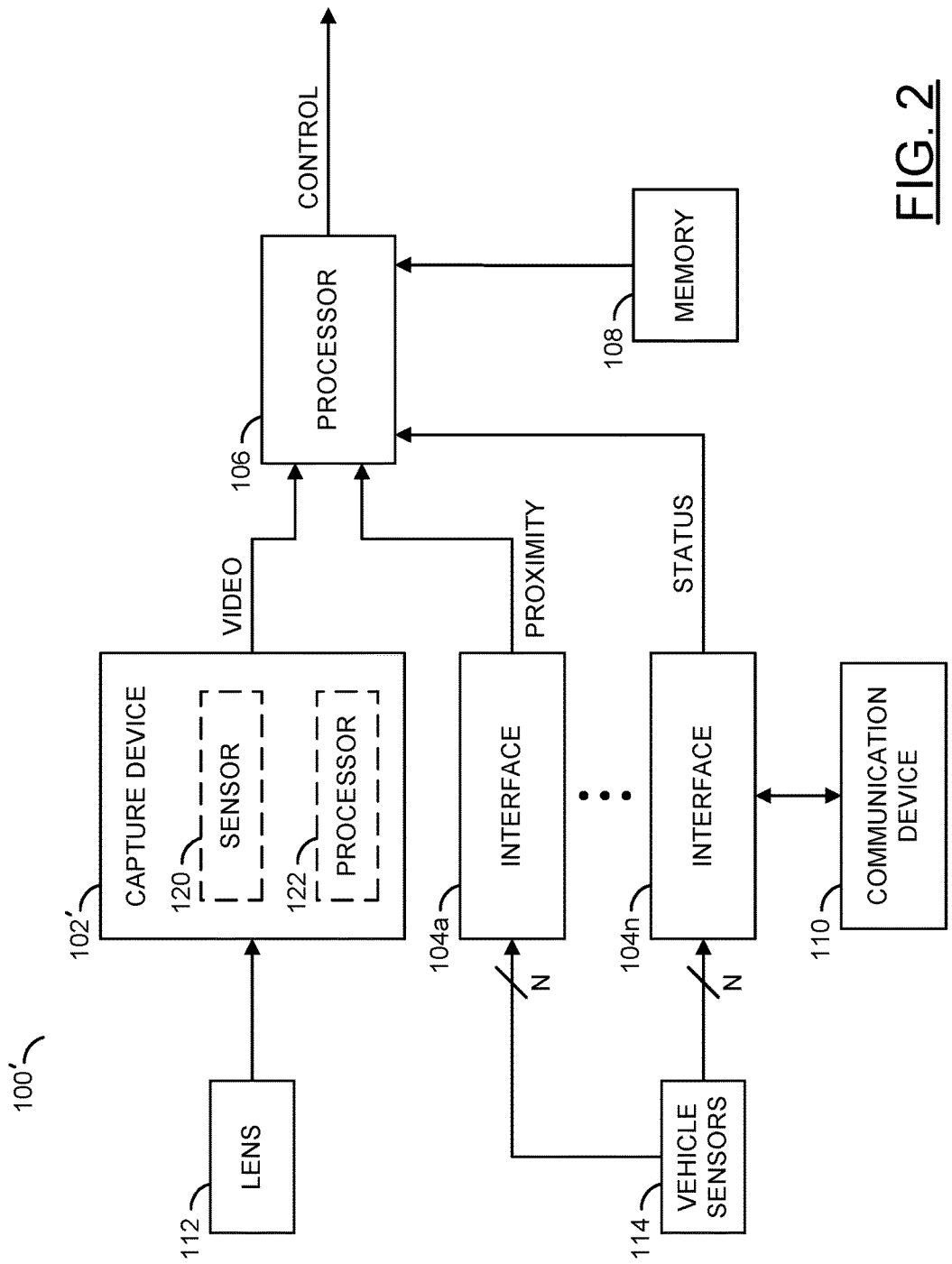
FIG. 2 is a block diagram of another example embodiment of an apparatus.

Referring to FIG. 2, a block diagram of an apparatus 100' is shown in accordance with an embodiment of the present invention. The camera system 100' may comprise the capture device 102', the interfaces 104*a*-104*n*, the processor 106, the memory 108, the communication device 110, the lens 112 and/or the vehicle sensors 114. The camera system 100' may be a distributed system (e.g., each component may be implemented separately throughout a vehicle). The capture device 102' may comprise a block (or circuit) 120 and/or a block (or circuit) 122. The circuit 120 may be a sensor. The circuit 122 may be a processor (e.g., a processor separate from the processor 106). The capture device 102' may implement a separate internal memory (e.g., a memory separate from the memory 108).

Figure 3:
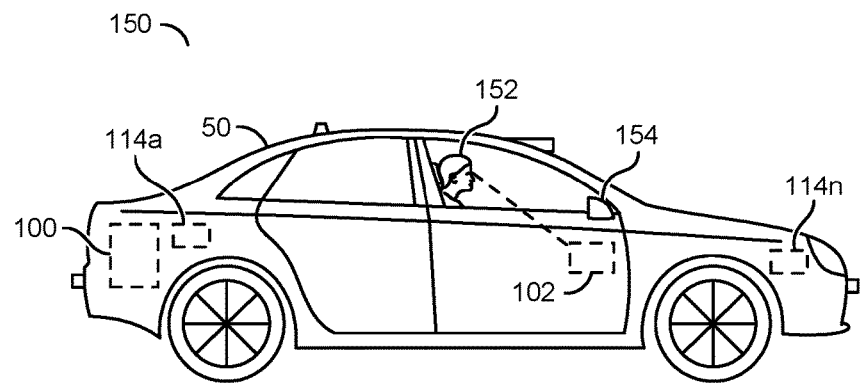
FIG. 3 is a diagram illustrating a capture device detecting a driver of an automobile.

Referring to FIG. 3, an embodiment 150 illustrating the capture device 102 detecting the driver of an automobile/vehicle 50 is shown. The camera system 100 is shown inside the vehicle 50. The capture device 102 is shown inside the vehicle 50. A driver 152 is shown seated in the vehicle 50. A side view mirror 154 is shown attached to the vehicle 50. Sensors 114*a*-114*b* are shown on (or in) the vehicle 50.

The camera system 100 is shown in the rear of the vehicle 50. A location of the camera system 100 may be varied according to the design criteria of a particular implementation. For example, in some embodiments, the vehicle 50 may allow for installation of the camera system 100 in a rear end of the vehicle 50. In other embodiments, the vehicle 50 may allow for installation of the camera system 100 in a front end of the vehicle 50. For example, the camera system 100 may be installed near and/or with the capture device 102 (e.g., in a dashboard of the vehicle 50). In another example, the camera system 100 (or the distributed camera system 100') may be distributed throughout the vehicle 50 (e.g., connections may be implemented between the camera system 100 and the capture device 102 such as a direct wired connection and/or a connection using a common bus line).

Generally, a position of the side view mirror 154 is adjustable using manual controls in the vehicle 50 available to the driver 152 (e.g., buttons on a panel on the inside of the door beside the driver 152, buttons on a center console, an interface on a touchscreen, buttons on a steering wheel, etc.). The camera system 100 may adjust the position/orientation of the side view mirror 154 automatically based on a field of view of the driver 152 determined by the processor 100. In some embodiments, the camera system 100 may adjust the position/orientation of the side view mirror 154 and the driver 152 may make further adjustments and/or fine-tune the positioning of the mirror 154 using the manual controls. Adjusting the mirror 154 may adjust a field of view (FOV) of the driver 152.

The capture device 102 is shown detecting the driver 152. The capture device 102 may also detect other objects in the vehicle 50 (e.g., a seat, a head rest, an arm rest, a rear window, a seatbelt, a center console, etc.). Based on the detected driver 152, the processor 106 may determine a position (e.g., a distance) of the driver 152 and/or a field of view of the driver 152.

The sensors 114*a*-114*n* are shown attached to (or in) the side of the vehicle 50. Generally, the sensors 114*a*-114*n* may be configured to detect nearby objects (e.g., objects within a pre-determined proximity to and/or radius of the vehicle 50). The sensors 114*a*-114*n* may be arranged on the vehicle 50 to provide proximity information about nearby objects. The sensors 114*a*-114*n* may present proximity information to the interface 104*a*. The interface 104*a* may present the proximity information (e.g., the signal PROXIMITY) to the processor 106. A location and/or a number of the sensors 114*a*-114*n* may be varied according to the design criteria of a particular implementation.

The sensors 114*a*-114*n* may be configured as a blind-spot detection system. The sensors 114*a*-114*n* may be implemented using proximity detection technology. Blind-spot detection systems may implement more than one sensor. For example, blind-spot detection systems may use multiple radars and/or sonars. The sensor array may be used to determine the position of objects in close proximity to the vehicle 50. For example, the sensors 114*a*-114*n* may implement a radar device, an array of radars, a sonar device, an array of sonars, a lidar device, an array of lidar devices, an ultra-sound device, an array of ultra-sound devices, etc. The types of the sensors 114*a*-114*n* may be varied according to the design criteria of a particular implementation.

Figure 4:
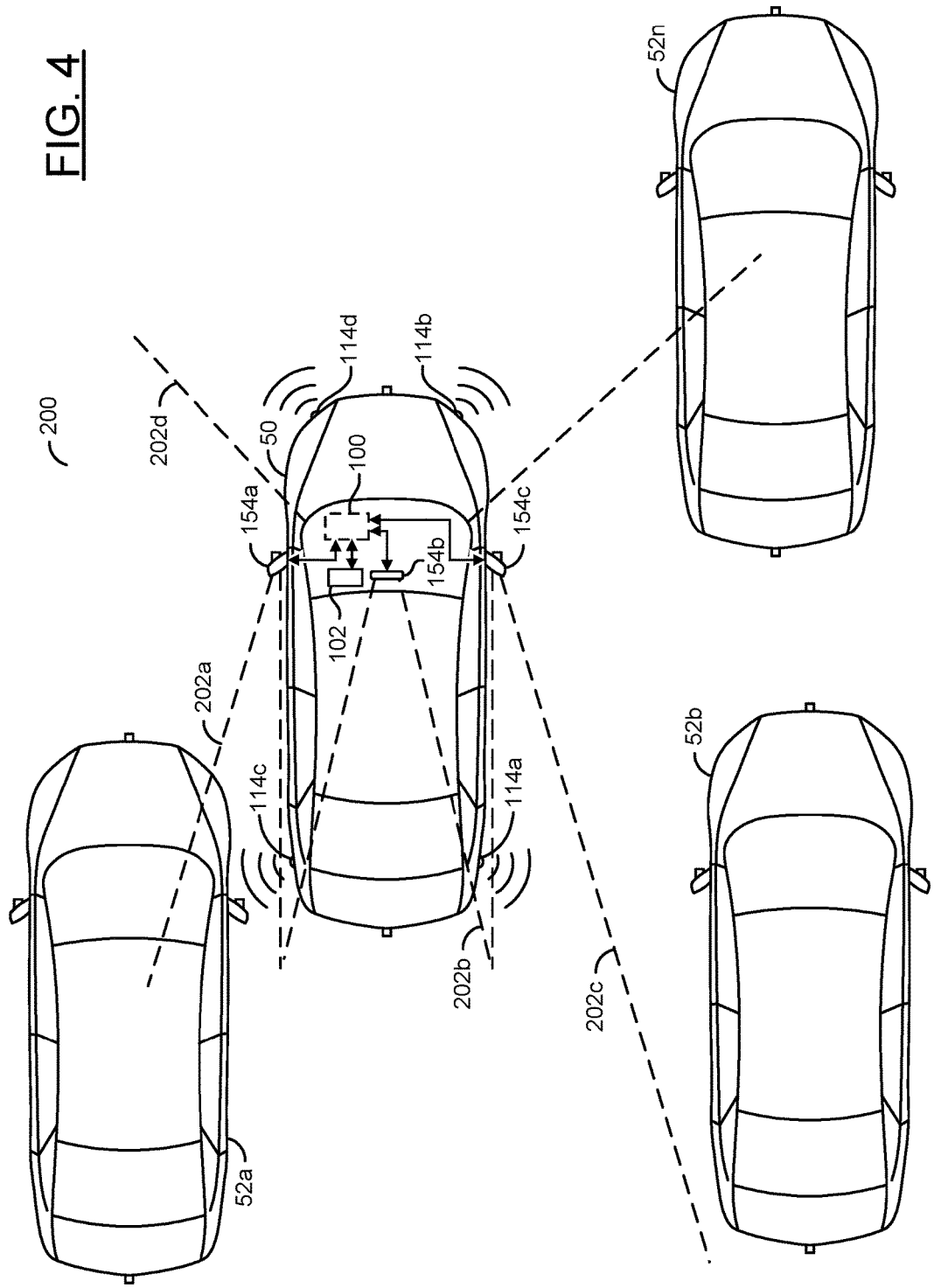
FIG. 4 is a diagram illustrating determined fields of view and blind-spot detection.

Referring to FIG. 4, an embodiment 200 illustrating determined fields of view and blind-spot detection is shown. An overhead (e.g., birds-eye-view) of the vehicle 50 is shown. Objects 52*a*-52*n* are shown around the vehicle 50. The objects 52*a*-52*n* may be nearby cars (or vehicles, or pedestrians, or structures, etc.).

The vehicle 50 is shown having mirrors 154*a*-154*c*. The mirror 154*a* may be a side view mirror on the driver side of the vehicle 50. The mirror 154*b* may be a rear view mirror of the vehicle 50. The mirror 154*c* may be a side view mirror on the passenger side of the vehicle 50. The number and/or types of the mirrors 154*a*-154*c* may be varied according to the design criteria of a particular implementation.

The vehicle 50 is shown having sensors 114*a*-114*d*. The sensors 114*a*-114*d* may be configured to detect nearby objects (e.g., proximity sensors). For example, the sensors 114*a*-114*n* may be implemented as radar devices and/or sonar devices. The sensors 114*a*-114*n* may be arranged at locations of the vehicle 50 to provide object detection for all sides of the vehicle 50. In some embodiments, the sensors 114*a*-114*n* may send data to the processor 106 (e.g., via the interface 104*a* as the signal PROXIMITY). The sensors 114*a*-114*n* may be used to detect the nearby cars 52*a*-52*n*.

Fields of view (e.g., FOVs) 202*a*-202*d* are shown. The FOVs 202*a*-202*d* may be determined by the processor 106. The FOVs 202*a*-202*c* may correspond with the mirrors 154*a*-154*c*. The FOV 202*a* is shown with respect to the side view mirror 154*a*. The FOV 202*b* is shown with respect to the rear view mirror 154*b*. The FOV 202*c* is shown with respect to the side view mirror 154*c*. The FOV 202*d* may correspond to a forward view of the driver 152. The FOVs 202*a*-202*d* may be determined based on a position of the driver 152, the orientation of the mirrors 154*a*-154*c* and/or the characteristics of the vehicle 50 (e.g., status information).

Each of the FOVs 202*a*-202*c* may represent a range of view when the driver 152 looks at a corresponding one of the mirrors 154*a*-154*c*. The FOV 202*d* may represent a range of view when the driver 152 looks through the windshield of the vehicle 50. Generally, the FOVs 202*a*-202*c* provide a view behind and/or beside the vehicle 50 and the FOV 202*d* provides a view in front of the vehicle 50. The FOVs 202*a*-202*d* may be used by the processor 106 to determine whether the objects 52*a*-52*n* are visible by the driver 152. For example, the objects 52*a*-52*n* that are in at least one of the FOVs 202*a*-202*d* may be visible by the driver 152. In another example, the objects 52*a*-52*n* that are not in at least one of the FOVs 202*a*-202*d* may not be visible by the driver 152.

In some embodiments, the vehicle sensors 114a-114n may be existing sensors of the vehicle 50. The camera system 100 may utilize existing radar-based blind-spot detection systems installed in vehicles and cross reference any objects (and their determined location) detected by the sensors 114a-114n with the FOVs 202a-202d of the driver 152. The FOVs 202a-202d may be determined using the driver monitoring camera lens 112 and/or information about the orientation of the mirrors 154a-154c, seat position, etc. (e.g., the status information). The camera system 100 may only alert the driver 152 (e.g., provide a warning) if the detected object is not present in any of the FOVs 202a-202d (e.g., visible to the driver 152 in the rear and/or side mirrors 154a-154c and/or visible through the windshield of the vehicle 50). The processor 106 may generate the signal CONTROL in order to alert the driver 152.

Each of the mirrors 154a-154c is shown connected to the camera system 100. The capture device 102 is shown connected to the camera system 100. The mirrors 154a-154c may send status information to the camera system 100 (e.g., to the interface 104).

The camera system 100 may be implemented to determine the FOVs 202a-202c corresponding to the mirrors 154a-154c for the vehicle 50 (e.g., a car, a truck, a motorcycle and/or any type of automobile). The visibility of the driver 152 through the mirrors 154a-154c may be based on the FOVs 202a-202c of the driver 152 of the vehicle 50. The camera system 100 may determine the corresponding FOVs 202a-202c for each of the mirrors 154a-154c of the vehicle 50. A number of FOVs 202a-202d may be determined (e.g., one for each of the mirrors 154a-154c of the vehicle 50 and/or the forward view through the windshield). For example, the vehicle 50 may have three mirrors (e.g., the two side view mirrors 154a and 154c and the rear view mirror 154b) and there may be three corresponding FOVs 202a-202c determined by the camera system 100. The camera system 100 may interface with other systems of the automobile 50 to determine the FOVs 202a-202d. For example, the FOVs 202a-202d may be based on characteristics of the driver 152 (height, preferences, etc.) and/or characteristics of the vehicle 50 (size, obstructions, visible zones, etc.).

In some embodiments, the camera system 100 may be installed in the vehicle 50 at a time of manufacturing. For example, the camera system 100 may be installed on a particular type (e.g., model, make, year, etc.) of vehicle 50 and the camera system 100 may store pre-determined status information about the vehicle 50 (e.g., a size, seat positioning, range of view of the mirrors, known sizes of particular objects, etc.).

In some embodiments, the camera system 100 may be installed in the vehicle 50 as a separate component (e.g., an after-market part). In one example, the camera system 100 may be designed and/or sold for a particular make/model of the vehicle 50 and store pre-determined status information (e.g., in the memory 108). In another example, the camera system 100 may be programmable and the status information may be entered in the camera system 100 based on the status information of the vehicle 50. For example, an online database may be implemented with status information for various types of vehicles (e.g., make, model, year, etc.) and the status information may be downloaded and stored in the camera system 100. The implementation of the camera system 100 in the vehicle 50 and/or a method of storing information about the vehicle 50 may be varied according to the design criteria of a particular implementation.

The capture device 102 may capture video image data (e.g., from the lens 112). In some embodiments, the capture device 102 may be a video capturing device such as a camera. In some embodiments, the capture device 102 may be a component of a camera (e.g., a camera pre-installed in the vehicle 50). The capture device 102 may capture data received through the lens 112 to generate a bitstream (e.g., generate video frames). For example, the capture device 102 may receive light from the lens 112. The lens 112 may be directed at the driver 152 to provide a targeted view of the driver 152.

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the driver 152 may be represented as the signal/bitstream/data VIDEO (e.g., a digital video signal). The capture device 102 may present the signal VIDEO to the processor 106. The signal VIDEO may represent the video frames/video data. The signal VIDEO may be a video stream captured by the capture device 102. In some embodiments, the capture device 102 may be implemented in the camera. In some embodiments, the capture device 102 may be configured to add to existing functionality of the camera.

The capture device 102 may be installed in the vehicle 50 (e.g., in the interior of the car 50 directed at the driver 152). In some embodiments, the capture device 152 may be pre-installed in the vehicle 50 and the camera system 100 may connect to the capture device 102. In other embodiments, the capture device 102 may be part of the camera system 100. The capture device 102 may be configured for driver monitoring. For example, the capture device 102 may be implemented to detect drowsiness and/or attentiveness of the driver 152. In another example, the capture device 152 may record the driver 152, (e.g., for use in teleconferencing). The capture device 102 may be configured to recognize the driver 152 through facial recognition. The camera system 100 may be configured to leverage pre-existing functionality of the pre-installed capture device 102. The implementation of the capture device 102 may be varied according to the design criteria of a particular implementation.

In some embodiments, the capture device 102' may implement the sensor 120 and/or the processor 122. The sensor 120 may receive light from the lens 112 and transform the light into digital data (e.g., the bitstream). For example, the sensor 120 may perform a photoelectric conversion of the light from the lens 112. The processor 122 may transform the bitstream into a human-legible content (e.g., video data). For example, the processor 122 may receive pure (e.g., raw) data from the sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the eyes of the driver 152. For example, the processor 122 may analyze the captured bitstream (e.g., using machine vision processing), determine a location of the eyes of the driver 152 and present the signal VIDEO (e.g., comprising information about the location of the eyes of the driver 152) to the processor 106. The processor 122 may be configured to determine the location of the eyes of the driver 152 (e.g., less analysis is performed by the processor 106). In another example, the processor 122 may generate the signal VIDEO comprising video frames and the processor 106 may analyze the video frames to determine the location of the eyes of the driver (e.g., more analysis is performed by the processor 106). The analysis performed by the processor 122 and/or the processor 106 may be varied according to the design criteria of a particular implementation.

The interfaces 104a-104n may receive data from one or more components of the vehicle 50. The signal STATUS may be generated in response to the data received from the components of the vehicle 50. In some embodiments, the interface 104a may receive data from the sensors 114a-114n (e.g., the radar devices). For example, the interface 104a is shown presenting the signal PROXIMITY in response to the radar device 114. In some embodiments, the interfaces 104a-104n may receive data from the processor 106. The interfaces 104a-104n may send data (e.g., instructions) from the processor 106 to the components of the vehicle 50. For example, the interfaces 104a-104n may be bi-directional.

In the example shown, the data received by the interface 104a may be the proximity information (e.g., presented to the processor 106 as the signal PROXIMITY). In the example shown, the data received by the interface 104n from the components of the vehicle 50 may be a seat position, a seat recline position, an angle of the bottom seat cushion, a mirror orientation, a speed of the vehicle, any information available from an on-board diagnostics (OBD) port of the vehicle 50, etc. (e.g., presented to the processor 106 as the signal STATUS). The type of data and/or the number of components of the vehicle 50 that provide data may be varied according to the design criteria of a particular implementation.

In the example shown (e.g., in FIG. 1 and FIG. 2), information from the sensor 114 (e.g., the radar device, the camera system, the sonar device, etc.) may be received by the interface 104a. For example, the interface 104a may be implemented as an electronic bus (e.g., a controller area network (CAN) bus). In another example, the interface 104a may be implemented as an Ethernet interface. In yet another example, the interface 104a may be implemented as an electronic device (e.g., a chip) with a CAN bus controller. In some embodiments, the sensor 114 may connect directly to the processor 106 (e.g., the processor 106 may implement a CAN bus controller for compatibility, the processor 106 may implement a serial peripheral interface (SPI), the processor 106 may implement another interface, etc.).

The interfaces 104a-104n may have implementations similar to the interface 104a described above. In some embodiments, each of the interfaces 104a-104n may provide a same connection type and/or protocol. In some embodiments, each of the interfaces 104a-104n may provide different connection types and/or protocols. The implementation of each of the interfaces 104a-104n may be varied according to the design criteria of a particular implementation.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the driver 152 in the video frame. In some embodiments, the processor 122 may be configured to detect the driver 152 and the processor 106 may receive the location of the eyes of the driver from the capture device 102'. In some embodiments, the processor 106 may be configured to analyze the video frame (e.g., the signal VIDEO). The processor 106 may be configured to detect a location and/or position of the eyes of the driver in the video frame. The processor 106 may determine a distance of the eyes of the driver from the camera based on information from the signal STATUS. In some embodiments, the processor 106 may receive the location of the eyes from the capture device 102' and distance of the eyes of the driver from the camera through one of the interfaces 104a-104n. The processor 106 may receive proximity information about nearby objects from the signal PROXIMITY. The information received by the processor 106 and/or the analysis performed by the processor 106 may be varied according to the design criteria of a particular implementation.

Based on the distance and/or location of the eyes of the driver and/or the mirrors of the vehicle, the processor 106 may determine the FOVs 202a-202d of the driver 152. The FOVs 202a-202d of the driver 152 may be based on the signal VIDEO and/or the signal STATUS. A location of the nearby objects 52a-52n may be based on the signal PROXIMITY. The processor 106 may generate the signal CONTROL in response to the determined FOVs 202a-202d and/or the sensors 114a-114n.

The signal CONTROL may be implemented to provide instructions to the various components of the vehicle 50. For example, the signal CONTROL may be used by components of the vehicle 50 to alert the driver 152. In some embodiments, the signal CONTROL may be presented to the interface 104 and the interface 104 may pass the signal CONTROL to one of the components of the vehicle 50. In some embodiments, the signal CONTROL may be presented directly to one of the components of the vehicle 50 by the processor 106. The signal CONTROL may be implemented to alert the driver 152 when one of the objects 52a-52n has been detected by the sensors 114a-114n and is not in one of the FOVs 202a-202d.

The processor 106 and/or the processor 122 may be implemented as an application specific integrated circuit (e.g., ASIC) or a system-on-a-chip (e.g., SOC). The processor 106 and/or the processor 122 may be configured to determine a current size of an object of known size (e.g., an object having a reference size). The processor 106 and/or the processor 122 may detect an object of known size in each video frame. The processor 106 and/or the processor 122 may determine a number of pixels (e.g., a width and/or a height) comprising the object of known size in the video frame. Based on the number of pixels of the object of known size in the video frame, the processor 106 and/or the processor 122 may estimate a distance of the driver from the lens 112. Whether the detection of the object of known size is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the objects of known size. For example, the memory 108 may store a reference size (e.g., the number of pixels of the object of known size in a video frame at a known distance) of the object of known size. The reference size stored in the memory 108 may be used to compare the current size of the object of known size detected in a current video frame. The comparison of the size of the object of known size in the current video frame and the reference size may be used to estimate a distance of the driver from the lens 112.

The memory 108 may store the pre-determined status information of the vehicle 50. For example, the status information of the vehicle 50 may be updated by overwriting the status information stored in the memory 108. In some embodiments, the memory 108 may store pre-defined preferences (e.g., mirror orientation) for each driver.

The communication device 110 may send and/or receive data to/from one of the interface 104a-104n. In some embodiments, the communication device 110 may be the OBD of the vehicle 50. In some embodiments, the communication device 110 may be implemented as a satellite (e.g., a satellite connection to a proprietary system). For example, the satellite 110 may receive data from one or more vehicles. The data received by the satellite 110 may be used by vehicle manufacturers to improve the driving experience and/or detect problems with vehicles. The data received by the satellite 110 may be used to provide roadside assistance. For example, aggregate data from the communication device 110 may determine behavioral patterns of drivers (e.g., how often drivers check the mirrors, whether drivers change the orientation of the mirrors, attentiveness of drivers, etc.).

The communication device 110 may implement vehicle-to-vehicle communication. In some embodiments, the communication device 110 may implement a wireless and/or cellular communication system (e.g., a 4G LTE connection). In some embodiments, the communication device 110 may provide a connection to a device of the driver 152 (e.g., a Bluetooth connection to a smartphone, a ZigBee connection to a mesh network of interconnected devices, a Wi-fi connection to a tablet computing device, etc.). The implementation of the communication device 110 may be varied according to the design criteria of a particular implementation.

The lens 112 (e.g., a camera lens) may be directed at the driver 152 (e.g., directed at the seat of the driver 152, provide a targeted view of the driver 152, etc.). For example, the lens 112 may be mounted on a dashboard of the vehicle 50. In another example, the lens 112 may be mounted as part of a console of the vehicle 50. The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The car 52a is shown in the FOV 202a. The sensor 114c may detect the car 52a (e.g., the car 52a is one of the detected objects 52a-52n). Since the detected object 52a is in the FOV 202a, the detected object 52a may be visible to the driver 152 (e.g., by using the mirror 154a). The processor 106 may receive the information about the detected object 52a from the sensor 114c (e.g., the signal PROXIMITY via the interface 104a). The processor 106 may determine the detected object 52a is in the FOV 202a. Since the detected object 52a is in the FOV 202a, the processor 106 may not generate the signal CONTROL (e.g., no alert and/or warning is issued by the camera system 100). The blind spot detection of the camera system 100 may remain silent.

The car 52b is shown outside the FOVs 202a-202d (e.g., the car 52b is just outside the FOV 202c). The sensor 114a may detect the car 52b (e.g., the car 52b is one of the detected objects 52a-52n). Since the detected object 52b is not in the FOVs 202a-202d, the detected object 52b may not be visible to the driver 152. The car 52b may be in a blind spot of the driver 152. The processor 106 may receive the information about the detected object 52b from the sensor 114a (e.g., the signal PROXIMITY via the interface 104a). The processor 106 may determine the detected object 52b is not in the FOVs 202a-202d. Since the detected object 52b is not in the FOVs 202a-202d, the processor 106 may generate the signal CONTROL (e.g., an alert and/or warning is issued by the camera system 100).

The car 52n is shown in the FOV 202d. The sensor 114b may detect the car 52n (e.g., the car 52n is one of the detected objects 52a-52n). Since the detected object 52n is in the FOV 202d, the detected object 52n may be visible to the driver 152 (e.g., by looking forward through the windshield). The processor 106 may receive the information about the detected object 52n from the sensor 114b (e.g., the signal PROXIMITY via the interface 104a). The processor 106 may determine the detected object 52n is in the FOV 202d. Since the detected object 52n is in the FOV 202d, the processor 106 may not generate the signal CONTROL (e.g., no alert and/or warning is issued by the camera system 100). The blind spot detection of the camera system 100 may remain silent.

Figure 5:
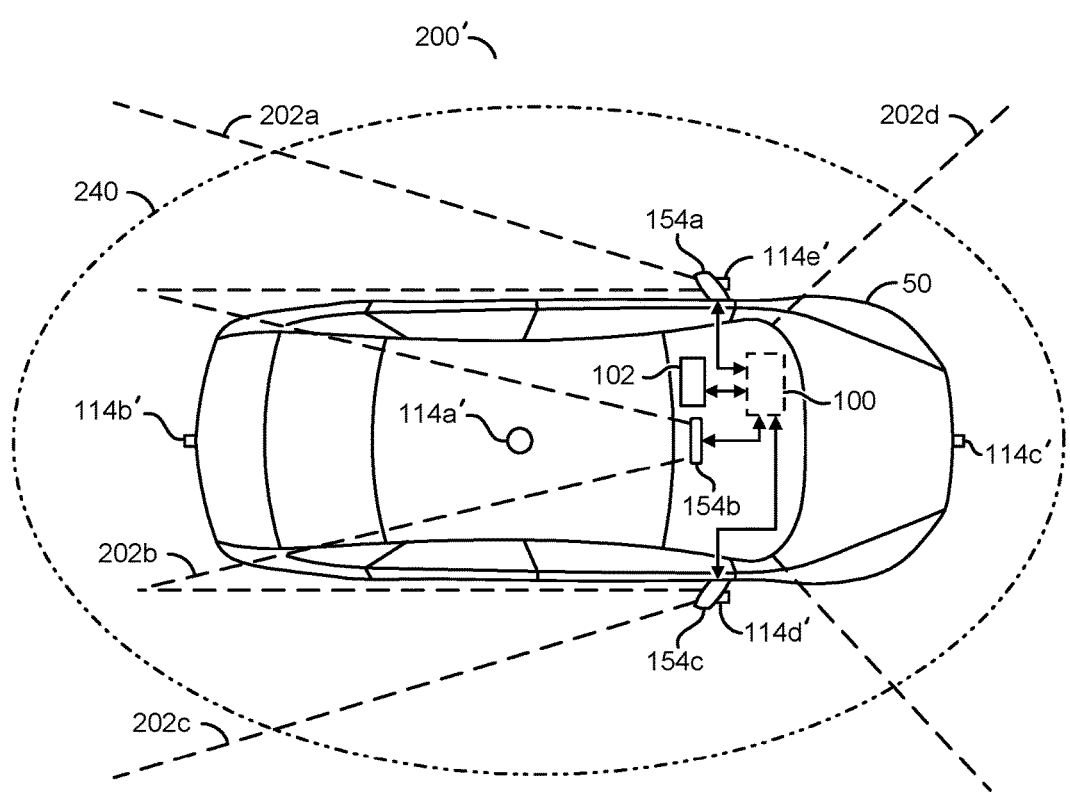
FIG. 5 is a diagram illustrating an alternate embodiment of determined fields of view and blind-spot detection.

Referring to FIG. 5, an alternate embodiment 200' of determined fields of view and blind-spot detection is shown. The vehicle 50 is shown having an array of sensors 114a'-114e'. The sensors 114a'-114e' are shown having a radius 240. The radius 240 may be a range of detection for the sensors 114a'-114n'. The size of the radius 114a'-114e' may be varied according to the design criteria of a particular implementation.

In some embodiments, radar-based blind-spot monitoring systems may be replaced and/or supplanted with a 360 degree camera surround system. For example, the sensor 114a' may implement a single camera providing a view of a radius around the vehicle 50 (e.g., a single camera configured to capture a 360 degree view and de-warp the captured video). In another example, the sensors 114b'-114e' may be used to implement a surround view camera system (e.g., a 4-camera surround view system). The sensors 114a'-114e' may be configured to implement machine-vision and/or video analysis to detect objects (e.g., the cars 52a-52n) and/or the locations of the objects 52a-52n around the vehicle 50. The number and/or types of cameras implemented as the sensors 114a'-114n' may be varied according to the design criteria of a particular implementation.

The sensors 114a'-114n' may be configured to analyze video to locate (e.g., detect) the objects 52a-52n. For example, the objects 52a-52n within the radius 240 may be detected objects. In another example, the objects outside of the radius 240 may not be detected objects. The sensors 114a'-114n' may send data (e.g., the signal PROXIMITY) to the processor 106 providing a location of any of the detected objects 52a-52n. The processor 106 may cross-reference the data from sensors 114a'-114n' to determine whether any of the detected objects 52a-52n are in the FOVs 202a-202d. If any of the detected objects 52a-52n are not in at least one of the FOVs 202a-202d, the processor 106 may generate the signal CONTROL. The signal CONTROL may notify the driver 152 of a detected object in a blind spot.

In some embodiments, the sensors 114a-114n (or 114a'-114n') may be configured to determine a status of the detected objects 52a-52n. For example, the sensors 114a-114n (or 114a'-114n') may be configured to determine a velocity of the detected objects 52a-52n (e.g., a speed and/or a direction of travel). In another example, the sensors 114a-114n (or 114a'-114n') may be configured to detect indicators (e.g., brake lights and/or turn signals) of the detected objects 52a-52n. The various types of status information of the detected objects 52a-52n that may be detected may be varied according to the design criteria of a particular implementation. The status information of the detected objects 52a-52n may be sent to the processor 106 via the signal PROXIMITY.

Figure 6:
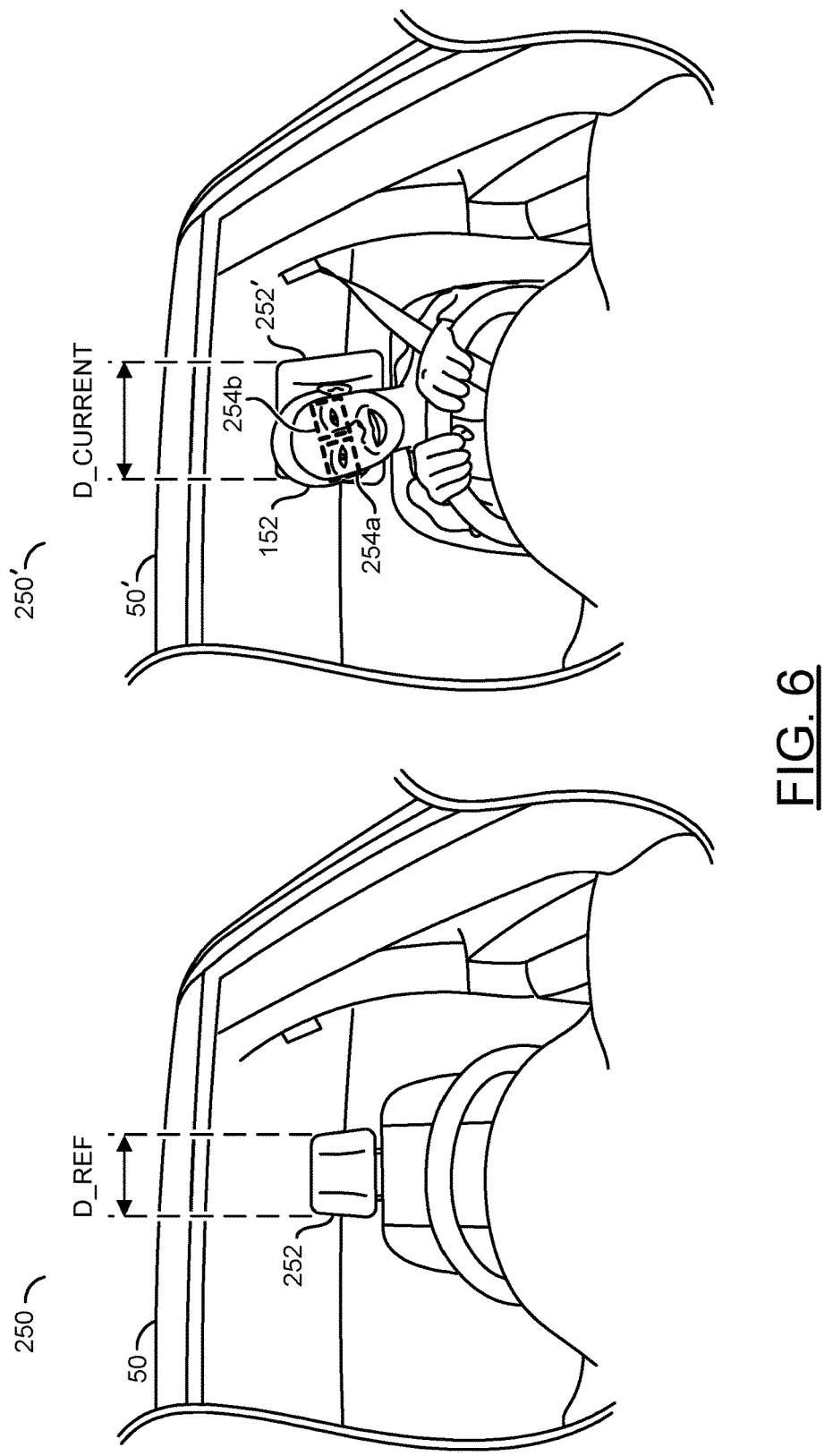
FIG. 6 is a diagram illustrating eye detection and object size comparison.

Referring to FIG. 6, video frames 250 and 250' illustrating eye detection and object size comparison are shown. The video frames 250 and 250' may be video frames generated by the capture device 102. The video frames 250 and/or 250' may represent a targeted view captured by the lens 112 mounted on the dashboard of the vehicle 50. The view captured for each of the video frames may be varied according to the design criteria of a particular implementation.

The video frame 250 may represent a reference frame. For example, the reference frame 250 may be stored in the memory 108. The reference frame 250 shows an object of known size 252 in the vehicle 50. The object of known size 252 may be a head rest of the driver side seat. The processor 106 and/or the processor 122 may determine the width of the object of known size 252 (e.g., based on the number of pixels in the video frame). The memory 108 may store the width of the object of known size 252 (e.g., D_REF). The width D_REF may be determined when the object of known size 252 is at a known distance from the lens 112. The width D_REF may be stored in the memory 108 as the reference size.

The video frame 250' may represent a current frame. For example, the capture device 102 may send the signal VIDEO as the current frame to the processor 106. In another example, the processor 122 may generate and/or analyze the current frame 250' (e.g., the current frame 250' may be stored in a memory of the capture device 102') and send a result of the analysis (e.g., the location of the eyes of the driver 152) to the processor 106. The current frame 250' shows the vehicle 50', the driver 152 and an object of known size 252'. The current frame 250' may be analyzed by the processor 106 and/or the processor 122. The processor 106 and/or the processor 122 may detect the eyes of the driver 152. Boxes 254a-254b may represent the detected eyes of the driver 152 in the current frame 250'.

The object of known size 252 and/or 252' may be an object physically connected to the seat of the driver 152. For example, the object of known size 252 and/or 252' may be the head rest as shown. In some embodiments, the object of known size 252 and/or 252' may be the seat of the driver 152, an arm rest of the seat of the driver 152 and/or a seat belt. Other objects in the reference frame 250 and/or the current frame 250' may have a known size (e.g., a steering wheel, a rear seat, a dashboard, a sunroof, a moonroof, etc.) but may be unsuitable for determining a distance of the driver 152 from the lens 112 (e.g., objects that generally have a fixed position in the video frames).

The distance of the driver 152 from the lens 112 may be estimated based on the object of known size 252 and/or 252' and characteristics of the driver 152. For example, if the headrest 252' is determined to be 4.5 feet away from the lens 112 an average sitting posture and head size may be used to estimate that the eyes of the driver 152 may be 3.5 feet from the lens 112. The characteristics of the driver 152 and/or the estimations performed may be varied according to the design criteria of a particular implementation.

The processor 106 and/or the processor 122 may be configured to detect the object of known size 252' in the current frame 250'. The object of known size 252' may be the head rest. The head rest 252' is shown closer in the current frame 250' than the head rest 252 in the reference frame 250. The processor 106 and/or the processor 122 may determine the width of the object of known size 252' (e.g., the number of pixels in the video frame). The memory 108 may store the width of the object of known size 252' (e.g., D_CURRENT). The width D_CURRENT may be used as the current size of the object of known size 252'. The current size D_CURRENT may be compared to the reference size D_REF by the processor 106 and/or the processor 122. Based on the comparison of the current size D_CURRENT and the reference size D_REF, the processor 106 and/or the processor 122 may estimate a distance of the driver 152 from the lens 112.

Using the detected eyes 254a-254b and the estimated distance of the driver 152 from the lens 112, the processor 106 and/or the processor 122 may determine the position (e.g., 3D coordinates and/or location coordinates) of the eyes of the driver 152. For example, the location of the detected eyes 254a-254b may represent one coordinate (e.g., a location coordinate on a first axis) for a vertical location of each eye in 3D space, and one coordinate (e.g., a location coordinate on a second axis) for a horizontal location of each eye in 3D space. The determined distance from the lens 112 may represent one coordinate (e.g., a location coordinate on a third axis) for a depth location of each of the detected eyes 254a-254b in 3D space. For example, the processor 122 may determine the location of the detected eyes 254a-254b in 3D space and transmit the location (e.g., using the signal VIDEO) to the processor 106.

Based on the determined position/location of the eyes of the driver 152 and the orientation of the mirrors 154a-154c (e.g., determined based on the signal STATUS), the processor 106 may determine the FOVs 202a-202c. Based on the determined position/location of the eyes of the driver 152, the processor 106 may determine the forward FOV 202d. The processor 106 may determine whether the detected objects (e.g., the cars 52a-52n) are in the FOVs 202a-202d or outside the FOVs 202a-202d (e.g., in the blind spots and/or blind zones of the driver 152). The processor 106 may generate the signal CONTROL in response to one or more of the determined FOVs 202a-202d and/or the detected objects 52a-52n. The signal CONTROL may provide a warning and/or a notification (e.g., on a display of the vehicle 50).

Figure 7:
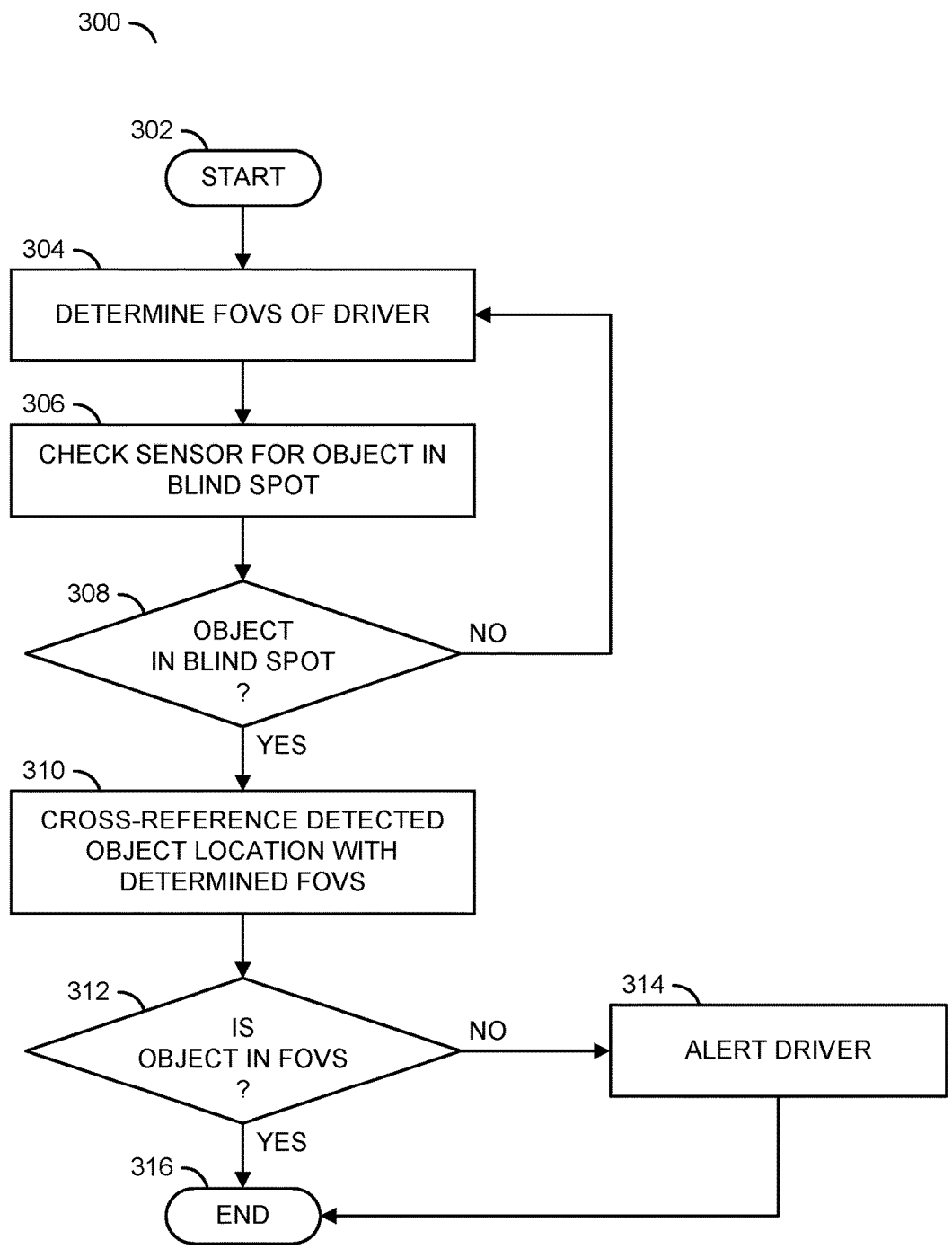
FIG. 7 is a flow diagram illustrating a method for alerting a driver of detected objects.

Referring to FIG. 7, a method (or process) 300 is shown. The method 300 may alert a driver of detected objects. The method 300 generally comprises a step (or state) 302, a step (or state) 304, a step (or state) 306, a decision step (or state) 308, a step (or state) 310, a decision step (or state) 312, a step (or state) 314, and a step (or state) 316.

The state 302 may start the method 300. Next, the state 304 may determine the FOVs (e.g., the FOVs 202a-202d) of the driver 152. Next, the state 306 may check the sensor 114 to determine if an object (e.g., one of the cars 52a-52n) is in the blind spot and/or blind zone. Next, the decision state 308 determines if an object is in a blind spot. If not, the method 300 moves back to the step 304. If there is an object in the blind spot determined by the decision step 308, the method 300 moves to the step 310. The step 310 cross references a location of the detected object with the determined FOVs 202a-202d. Next, the step 312 determines if the object is in one of the FOVs 202a-202d. If not, the method 300 moves to the step 314. The step 314 alerts the driver 152. If the decision step 312 determines that the object is in the field of view, the method 300 ends at the step 316.

Figure 8:
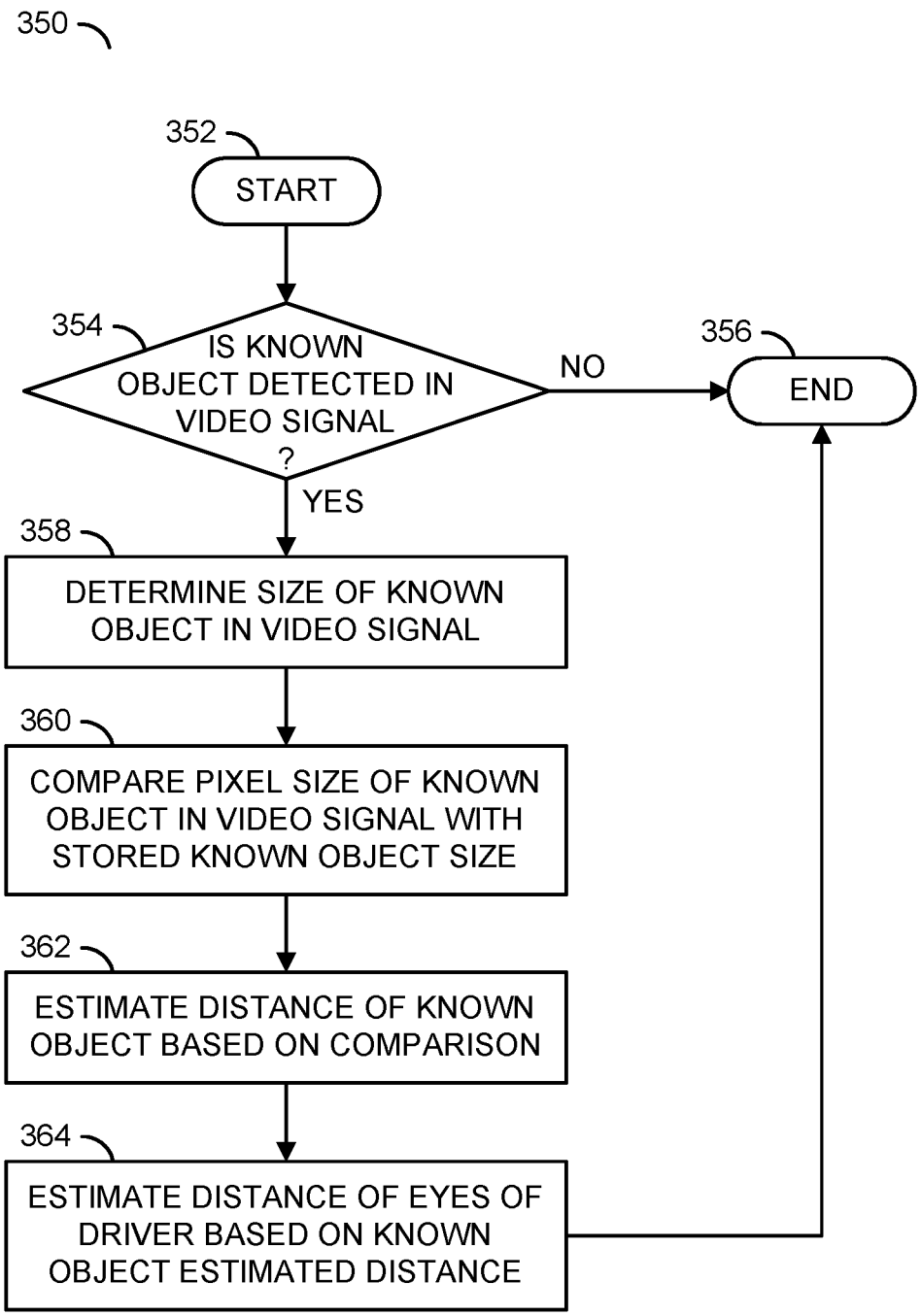
FIG. 8 is a flow diagram illustrating a method for comparing objects of known size to determine distance.

Referring to FIG. 8, a method (or process) 350 is shown. The method 350 may compare objects of known size to determine distance. The method 350 generally comprises a step (or state) 352, a decision step (or state) 354, a step (or state) 356, a step (or state) 358, a step (or state) 360, a step (or state) 362, and a step (or state) 364.

The state 352 may start the method 350. Next, the method 350 may move to the decision state 354. If the decision state 354 determines the known object (e.g., the head rest, the seat, the arm rest, etc.) is not detected in the video frame, the method 350 may move to the state 356. The state 356 may end the method 350. If the decision state 354 determines the known object is detected in the video frame, the method 350 may move to the state 358.

The state 358 may determine the size of the known object from the video signal/frame (e.g., a number of pixels). Next, the state 360 may compare a pixel size of the known object from the video signal/frame (e.g., D_CURRENT) with a stored known object size (e.g., the reference size D_REF stored in the memory 108). The state 362 may estimate the distance (e.g., from the camera lens 112) of the known object based on the comparison. The state 364 may estimate the distance of the eyes of the driver 152 from the camera lens 112 based on the estimated distance of the known object. Next, the method 350 may move to the end state 356.

In some embodiments, a calculation using an object of known size may be performed. For example, an object of known size may be a part of the seat of the driver 152 (e.g., the head rest, the width of the seat at a given height, an arm rest, a seat belt, etc.). The type of object of known size may be varied according to the design criteria of a particular implementation.

Knowing the width of the object, the exact FOV of the driver-facing camera lens 112 and the number of pixels the object occupies in the video frame, the distance and/or position of the eyes of the driver 152 from the camera lens 112 may be calculated. For example, a distance of the seat of the driver 152 from the camera lens 112 may be determined. Based on the distance of the seat, the distance of the eyes of the driver 152 from the camera lens 112 may be calculated (or estimated). For example, the distance of the eyes of the driver 152 from the camera lens 112 may be estimated based on assumptions about typical sitting posture of a driver. In some embodiments, anatomical, ergonomic and/or physiological data may be used to make assumptions about the seating position of the driver 152.

Figure 9:
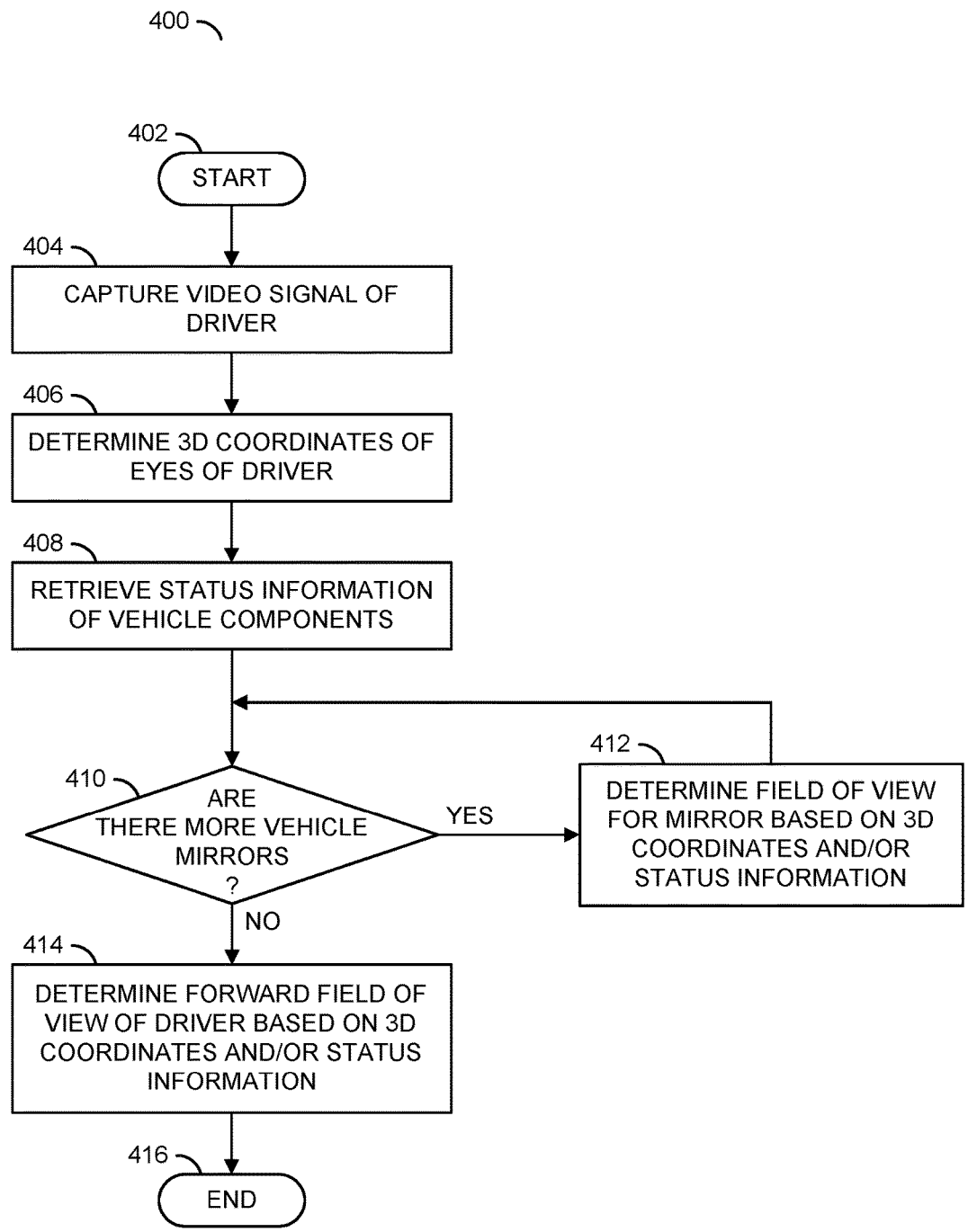
FIG. 9 is a flow diagram illustrating a method for determining fields of view of the driver.

Referring to FIG. 9, a method (or process) 400 is shown. The method 400 may determine fields of view of the driver. The method 400 generally comprises a step (or state) 402, a step (or state) 404, a step (or state) 406, a step (or state) 408, a decision step (or state) 410, a step (or state) 412, a step (or state) 414, and a step (or state) 416.

The state 402 may start the method 400. Next, the state 404 may capture a video signal of a driver 152. Next, the state 406 may determine one or more 3D coordinates of the eyes of the driver 152. Next, the state 408 may retrieve the status information of the various components of the vehicle 50 (e.g., a location and/or orientation of the mirrors 154a-154c). Next, the method 400 may move to the decision state 410.

The decision state 410 may determine if there are more vehicle mirrors. If so, the method 400 moves to the state 412.

The state 412 may determine a field of view for the mirror (e.g., the FOVs 202a-202c corresponding to the mirrors 154a-154c) based on the 3D coordinates and/or the status information. The method 400 then moves back to the decision state 410. If the decision state 410 determines that there are not more mirrors on the vehicle 50, the method 400 moves to the state 414. The state 414 may determine a forward field of view (e.g., the FOV 202d) of the driver 152 based on the 3D coordinates and/or the status information. The method 400 then ends at the state 416.

Figure 10:
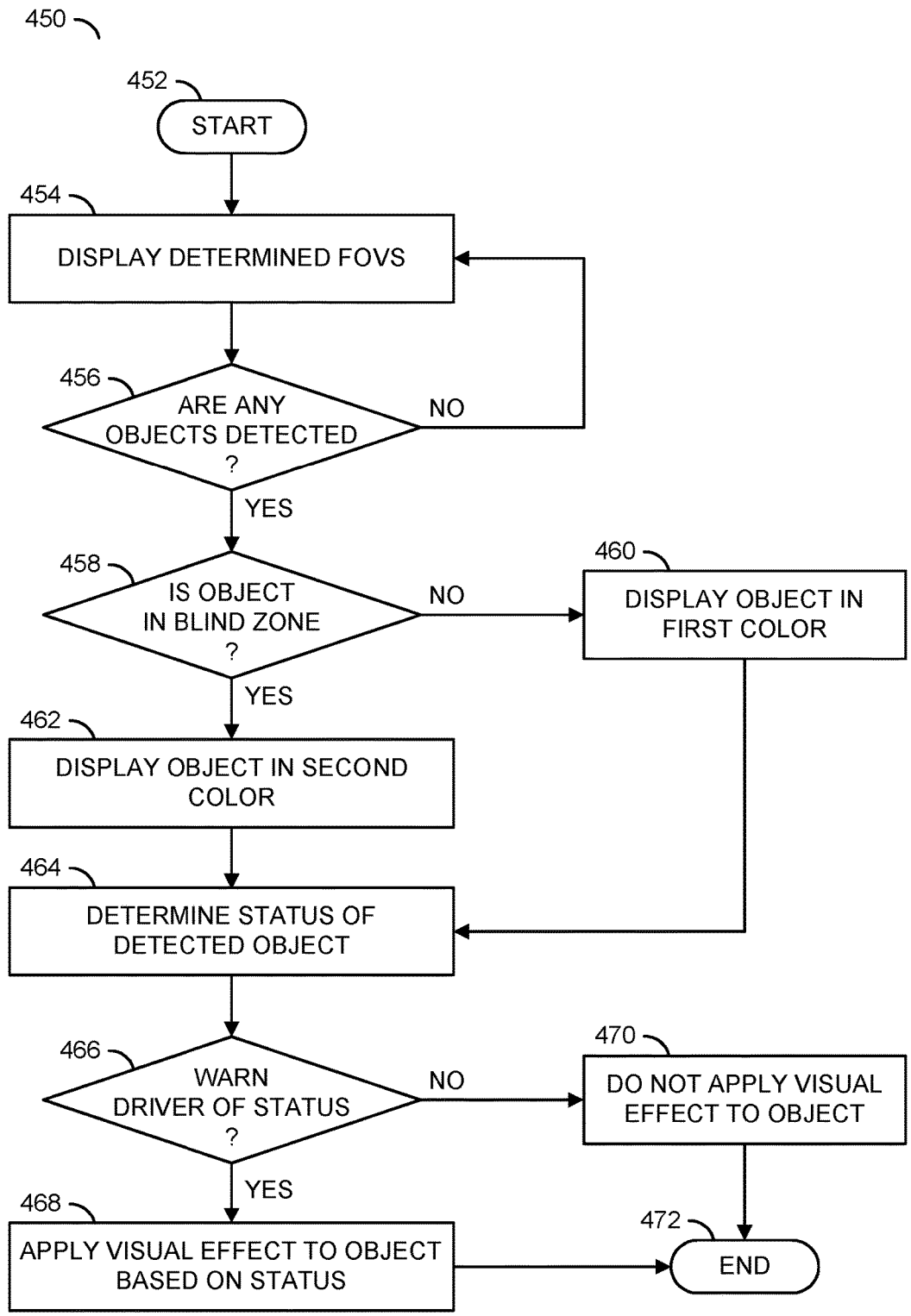
FIG. 10 is a flow diagram illustrating a method for displaying detected objects and blind-zones.

Referring to FIG. 10, a method (or process) 450 is shown. The method 450 may display detected objects and blindzones. The method 450 generally comprises a step (or state) 452, a step (or state) 454, a decision step (or state) 456, a decision step (or state) 458, a step (or state) 460, a step (or state) 462, a step (or state) 464, a decision step (or state) 466, a step (or state) 468, a step (or state) 470, and a step (or state) 472.

The state 452 may start the method 450. Next, the state 454 may display a determined field of view (e.g., display a representation of the FOVs 202a-202d on a display device of the vehicle 50). Next, the decision state 456 determines whether objects are detected (e.g., the cars 52a-52n). If not, the method 450 moves back to the state 454. If so, the method 450 moves to the decision state 458.

The decision state 458 determines if there is an object in the blind zone. If not, the method 450 moves to the state 460. The state 460 displays the object (e.g., a representation of one of the cars 52a-52n) in a first color. Next, the method 450 may move to the state 464. If the decision state 458 determines there is an object in a blind zone, the method 450 moves to the state 462. The state 462 displays the object (e.g., a representation of one of the cars 52a-52n) in a second color. Next, the state 464 determines the status of the detected object. After the state 464, the method 450 moves to the decision state 466.

The decision state 466 determines whether the driver 152 should be warned. If so, the method 450 moves to the state 468. The state 468 applies a visual effect to an object based on the status. Next, the method 450 may move to the state 472. If the decision state 466 determines it is not necessary to warn the driver of the status, the method 450 moves to the state 470. The state 470 does not apply a visual effect to the object. Next, the method 450 may move to the state 472. The method 450 ends at the state 472.

The FOVs 202a-202d and/or the detected objects may be presented to the driver 152. For example, the vehicle 50 may have a display unit/system (e.g., an infotainment system, an instrument cluster, etc.) and/or a heads-up display. Various representations of the FOVs 202a-202d and/or the detected objects 52a-52n may be displayed. For example, the represented version of the FOVs 202a-202d and/or detected cars surrounding the vehicle 50 may be a drawing or graphical representation on the instrument cluster and/or heads-up display of the vehicle 50. For example, a display presenting a birds-eye-view (e.g., similar to FIG. 4) may be displayed indicating the FOVs 202a-202d and the objects 52a-52n.

In some embodiments, the detected objects 52a-52n may be displayed in different colors depending on whether or not the detected objects 52a-52n are in the blind zone. For example, the car 52a may be displayed in red as a warning that the car 52a is in a blind spot (e.g., are outside the FOVs 202a-202d) while the cars 52b and 52n may be displayed in green since the cars 52b and 52n are not in a blind spot (e.g., are inside the FOVs 202a-202d). In some embodiments, the sensor 114 may determine a status of the detected objects 52a-52n. For example, the status of the detected objects 52a-52n may be based on a velocity of the detected objects 52a-52n (a speed comparison, a change of speed, a change of direction (e.g., changing lanes), a detected turn signal, etc.).

The status of the detected objects 52a-52n may be presented to the processor 106 via the signal PROXIMITY. Different visual effects may be presented based on the status of the detected objects 52a-52n. For example, a detected car that is determined to have a status of changing lanes may be presented with a blinking icon. The type of visual effects and/or the status detected may be varied according to the design criteria of a particular implementation.

In some embodiments, a direct distance measurement of the driver from the camera lens 112 may be determined using a depth sensing camera system. The camera lens 112 (or camera type) connected to the capture device 102 may be a depth sensing camera configured to implement one or more of various depth sensing camera technologies. For example, the depth sensing camera technology implemented may be time-of-flight. In another example, the depth sensing camera technology implemented may be stereo triangulation. In yet another example, the depth sensing camera technology implemented may be sheet of light triangulation, structured light, interferometry and/or coded aperture. In some embodiments more than one camera lens 112 may be implemented. The type, number of cameras, camera lenses 112 and/or depth sensing technologies implemented may be varied according to the design criteria of a particular implementation.

Based on the location of the eyes in the video frame and the distance of the eyes from the camera lens 112, an estimate of the position of the eyes (e.g., in 3D space) relative to the mirrors 154a-154c may be determined. Based on the position of the eyes relative to the mirrors 154a-154c, the corresponding FOVs 202a-202d of the driver 152 for each eye in each mirror and the forward view of the driver through the windshield may be determined. The camera system 100 may then determine possible FOVs 202a-202d for each eye for possible mirror orientations.

The processor 106 may be configured to determine the FOVs 202a-202c based on the orientation of the mirrors 154a-154c (e.g., the status information). Based on the FOVs 202a-202d, the processor 106 may determine which detected objects are visible to the driver 152. The signal CONTROL may be generated by the processor 106 to provide object detection for detected objects that are not visible by the driver 152 (e.g., no in any of the FOVs 202a-202d).

In some embodiments, the processor 106 may be configured to determine an intention of the driver 152. For example, the signal STATUS may present the processor 106 with information about the driver (e.g., the driver 152 has applied the brakes, the driver 152 has activated a turn signal, the driver 152 has accelerated, etc.). In another example, the signal VIDEO may present the processor 106 with information about the driver (e.g., the driver 152 is turning the steering wheel, the driver 152 is not paying attention, etc.).

Based on the information about the driver 152, the processor 106 may determine whether or not to generate the signal CONTROL. For example, no warning may be generated by the processor 106 if the object 52a is in the FOV 202a of the driver 152. However, if the processor 106 determines the intention of the driver 152 is to move into the path of the object 52a the processor 106 may generate the warning (e.g., the signal CONTROL). For example, based on a status of the object 52a (e.g., the speed and/or location indicating the object 52a is in the left lane with respect to the vehicle 50) and the determined intention of the driver 152 (e.g., the driver 152 has activated the left-turn signal and/or has started to move the steering wheel to the left) the processor 106 may generate the warning (e.g., over-ride the normal warning threshold).

The functions performed by the diagrams of FIGS. 7-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a camera configured to generate a video signal based on a targeted view of a driver;
a sensor configured to generate a proximity signal in response to detecting an object within an area; and
a processor configured to (A) determine a location of said object with respect to a vehicle in response to said proximity signal, (B) calculate current location coordinates of eyes of said driver detected in said video signal, (C) determine a field of view of said driver based on said current location coordinates of said eyes, (D) perform a cross reference between (i) said field of view and (ii) said location of said object, and (E) generate a control signal, wherein (i) said cross reference is configured to determine whether said object is within said field of view using said current location coordinates of said eyes at a time when said proximity signal is received, (ii) said current location coordinates of said eyes are determined based on an analysis of one or more video frames of said video signal to determine (a) one or more of a first location coordinate and a second location coordinate of said eyes and (b) a depth coordinate representing a distance of said eyes from said camera, (iii) said depth coordinate is determined based on a comparison of a reference number of pixels of a vehicle component in a reference video frame to a current number of pixels of said vehicle component in said video frames, (iv) said vehicle component is capable of relative movement with respect to said camera and (v) said control signal is used to prevent an alert when said location of said object is in said field of view of said driver.

2. The apparatus according to claim 1, wherein said sensor is implemented as at least one of a single camera and a camera surround view system.

3. The apparatus according to claim 1, wherein said field of view of said driver comprises one of a number of fields of view, each corresponding to a respective one of mirrors of said vehicle.

4. The apparatus according to claim 1, wherein said field of view of said driver comprises a forward view of said driver.

5. The apparatus according to claim 1, wherein said video signal comprises a plurality of digital images.

6. The apparatus according to claim 1, wherein said processor is further configured to generate said control signal when said object is present in said field of view corresponding to a visibility of said driver through a mirror of said vehicle.

7. A method for alerting a driver, comprising the steps of:
(A) receiving a video signal based on a targeted view of a driver;
(B) receiving status information about one or more components of a vehicle;
(C) receiving a proximity signal in response to detecting an object within a predetermined radius of said vehicle;
(D) determining a location of said object with respect to said vehicle in response to said proximity signal;
(E) calculating current location coordinates of eyes of said driver detected in said video signal;
(F) determining a field of view of said driver at a time when said proximity signal is received based on (i) said status information and (ii) said current location coordinates of said eyes;
(G) performing a cross reference between (i) said field of view of said driver and (ii) said location of said object from said proximity signal; and
(H) generating a control signal, wherein (i) said cross reference is configured to determine whether said object is within said field of view using said current location coordinates of said eyes at said time said proximity signal is received, (ii) said current location coordinates of said eyes are determined based on an analysis of one or more video frames of said video signal to determine (a) one or more of a first location coordinate and a second location coordinate of said eyes and (b) a depth coordinate representing a distance of said eyes from a camera, (iii) said depth coordinate is determined based on a comparison of a reference number of pixels of a vehicle component in a reference video frame to a current number of pixels of said vehicle component in said video frames, (iv) said vehicle component is capable of relative movement with respect to said camera and (v) said control signal is used to alert said driver when said location of said object is not in said field of view of said driver.

8. The method according to claim 7, further comprising the step of:
presenting a represented version of at least one of (a) said detected object and (b) said field of view in said vehicle.

9. The method according to claim 8, wherein said represented version is presented on a display unit of said vehicle.

10. The method according to claim 8, further comprising the steps of:
generating said detected object in a first color for said represented version if said detected object is outside said field of view; and
generating said detected object in a second color for said represented version if said detected object is inside said field of view.

11. The method according to claim 8, further comprising the step of:
implementing visual effects for said represented version corresponding to (i) a velocity of said detected object and (ii) a status of said detected object.

12. The method according to claim 7, further comprising the step of:
determining an intention of said driver, wherein said generation of said control signal is based on said intention of said driver.

13. The method according to claim 7, further comprising the step of:
determining if said location of said object is in an actual blind-spot of said driver.

* * * * *